(12) United States Patent
Di Giovanni et al.

(10) Patent No.: US 11,131,249 B2
(45) Date of Patent: Sep. 28, 2021

(54) REDUCTION OR DIFFERENTIAL-TYPE DEVICE FOR A TURBINE ENGINE OF AN AIRCRAFT

(71) Applicant: SAFRAN TRANSMISSION SYSTEMS, Colombes (FR)

(72) Inventors: Jean-Charles Michel Pierre Di Giovanni, Issy-les-Moulineaux (FR); Adrien Louis Simon, Paris (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 16/522,507

(22) Filed: Jul. 25, 2019

(65) Prior Publication Data
US 2020/0032716 A1    Jan. 30, 2020

(30) Foreign Application Priority Data
Jul. 26, 2018   (FR) ...................................... 1856983

(51) Int. Cl.
*F02C 7/36*       (2006.01)
*F16C 33/10*      (2006.01)
(Continued)

(52) U.S. Cl.
CPC ................. *F02C 7/36* (2013.01); *F16H 1/28* (2013.01); *F16H 48/06* (2013.01)

(58) Field of Classification Search
CPC .... F02C 7/36; F16H 1/28; F16H 48/06; F16C 33/10–1095
See application file for complete search history.

(56) References Cited

U.S. PATENT DOCUMENTS 4,192,560 A * 3/1980 Hartnett .................. F16C 19/30
                                                                384/572
4,934,841 A * 6/1990 De Vito .............. F16C 33/4635
                                                                384/572
(Continued)

FOREIGN PATENT DOCUMENTS

EP      3 159 578 A1    4/2017
JP      2009-144533 A    7/2009
WO      2014/184583 A1   11/2014

OTHER PUBLICATIONS

French Search Report and Written Opinion dated Feb. 26, 2019, issued in corresponding French Application No. 1856983, filed Jul. 26, 2018, 10 pages.

*Primary Examiner* — Tisha D Lewis
(74) *Attorney, Agent, or Firm* — Christensen O'Connor Johnson Kindness PLLC (57) ABSTRACT

A device includes a central sun gear with a rotation axis X, a ring gear extending about the axis X and the sun gear, and a planetary carrier supporting an annular row of planet gears arranged between the sun gear and the ring gear. Each of the planet gears may be rotationally guided by at least one bearing extending about a tubular support with an axis Y of the planetary carrier. The tubular support includes an inner cavity for receiving oil and substantially radial through-orifices for the passage of oil from the inner cavity to the at least one bearing. The least one bearing may include two bearings mounted coaxially and adjacently around the support. The bearings may include cages with substantially similar diameters of which the facing peripheral edges are shaped to guide the oil supplying the bearings radially outwards with respect to the axis Y.

17 Claims, 5 Drawing Sheets

(51) Int. Cl.
*F16H 1/28* (2006.01)
*F16H 48/06* (2006.01)

(56) References Cited

U.S. PATENT DOCUMENTS

| | | | | |
|---|---|---|---|---|
| 5,391,005 A | * | 2/1995 | Alling | F16C 19/48 |
| | | | | 384/572 |
| 6,206,576 B1 | * | 3/2001 | Wiehl | F16C 33/546 |
| | | | | 384/572 |
| 8,876,647 B2 | * | 11/2014 | Gallet | F16H 57/042 |
| | | | | 475/159 |
| 8,926,191 B2 | * | 1/2015 | Fugel | F16C 19/305 |
| | | | | 384/623 |
| 2015/0377343 A1 | | 12/2015 | Fugel et al. | |

* cited by examiner

REDUCTION OR DIFFERENTIAL-TYPE DEVICE FOR A TURBINE ENGINE OF AN AIRCRAFT

FIELD OF THE DISCLOSURE

The present disclosure relates to the field of reduction gears or mechanical differentials for a turbine engine, in particular of an aircraft.

BACKGROUND

The state of the art comprises, in particular, documents WO-A1-2010/092263, FR-A1-2 987 416, US-A1-2015/377343, WO-A1-2014/184583, EP-A1-3 159 578, JP-A-2009 144533 and FR-A1-3 041 054.

Current turbine engines, in particular turbine engines comprising one or more propellers generating a secondary flow, comprise a transmission system, termed reduction gear, to drive this/these propeller(s) at an adequate rotational speed from the turbine shaft driving the primary body of the engine.

The functioning of reduction gears, in particular in turbine engines provided with a fan propeller with an elevated dilution rate, requires a particularly high oil flow rate, of approximately 6000 to 7000 liters per hour during take-off, to ensure the lubrication and cooling of the pinions and bearings thereof.

Among the reduction gears used, there are planetary reduction gears and epicyclic gear trains that have the advantage of providing significant reduction rates of the rotational speed while taking up a reduced amount of space.

Such a reduction gear comprises a planetary pinion or a central pinion, termed sun gear, and an outer ring gear with satellite pinions, termed planet gears, that are engaged with the sun pinion and the ring gear, the support of one of these three components having to be rotationally immobilized so that the gear train can function as a reduction gear.

When the planetary carrier is rotationally secured, the sun gear and the ring gear are driving and driven, respectively, or conversely. The reduction gear is then of the "planetary" type.

In the opposite and more frequent case of an epicyclic gear train reduction gear, the outer ring gear is rotationally immobilized and the sun pinion and planetary carrier are respectively driving and driven.

This same structure can create a mechanical differential. In this case, all three components, the sun gear, planet gears and ring gear, are rotationally mobile.

However, this type of reduction gear or differential has disadvantages relating to the lubrication thereof.

According to the current technology, a planet gear is generally rotationally guided by a smooth bearing that extends around a tubular support of the planetary carrier, said tubular support comprising an inner cavity receiving the oil and substantially radial through-orifices for the passage of oil from the inner cavity to the smooth bearing.

The heat generated by the passage of the mobile elements of a roller bearing must be evacuated as fast as possible while limiting the recirculation thereof to a minimum. The recirculation of dirty and hot oil does not enable the evacuation of calories and has no risk of premature wear of the parts and coking.

The present invention proposes to improve this technology with a simple, efficient and economical solution to optimize the lubrication of the bearings.

SUMMARY

The present disclosure relates to a reduction gear device or of the differential device for a turbine engine of an aircraft. The reduction gear device includes a central sun gear with a rotation axis X, a ring gear extending about the axis X and the sun gear, and a planetary carrier supporting an annular row of planet gears arranged between the sun gear and the ring gear, and engaged with the sun gear and the ring gear. The planet gears have rotation axes Y substantially parallel to said axis X. The sun gear includes means for coupling, e.g. a coupler, to a first shaft of the turbine engine, and at least one from among the planetary carrier and the ring gear comprising connection means, e.g., a connector, to another shaft of the turbine engine. Each of the planet gears is rotationally guided by at least one bearing extending about a tubular support with an axis Y of the planetary carrier. The tubular support includes an inner cavity for receiving oil and substantially radial through-orifices for the passage of oil from the inner cavity to the at least one bearing. In some embodiments, at least two bearings are mounted coaxially and adjacently around the support and comprise annular rows of roller bearings maintained in cages with substantially similar diameters and of which the facing peripheral edges are shaped to guide the oil supplying the bearings radially outwards with respect to said axis Y. These peripheral edges each include a frusto-conical portion or surface and/or an annular end rim that extends radially outwards.

The device can thus be a planetary-type or epicyclic-type reduction gear or a mechanical differential. The bearings of the planet gears are roller bearings and the present disclosure optimizes the shape of the cages of these bearings to optimize the flow of lubricating oil from the bearings. The flow of which, owing to centrifugal forces during operations, is directed radially outwards with respect to the axis Y and then with respect to the axis X. The present disclosure thus limits the recirculation of oil during operations to increase the evacuation of generated heat and the performance level of the device.

In some embodiments, the device may include three bearings mounted coaxially and in an adjacent manner around the support. In some instances, the number of bearings is not limiting. The greater the number of bearings, the easier it is to consider reducing the radial dimensions thereof and therefore the radial volume thereof, to the detriment however of the axial volume thereof as they are in this case arranged axially, one next to the other, to form one or more rows.

In some embodiments, the two peripheral edges of the bearing located between two other bearings may include a frusto-conical portion or surface. If three adjacent bearings are present, the cage of the central bearing can be different from the cages of the side bearings as it guides the oil to each of the axial ends thereof.

In further embodiments, the frusto-conical portion or surface may be connected to an annular end rim that extends radially outwards. In some instances, this rim may enable guiding oil as close as possible to the outer ring of the bearings and therefore reducing the radial distance intended to be covered by the drops of oil projected on the ring during operations. In some instances, the rim further may enable rigidifying the cage, thus limiting load-induced deflections. In still further instances, the rim may enable limiting the transition of particles from one row of roller bearings to the next, which may limit the wear of parts and the coking of oil.

In some embodiments, the facing peripheral edges may be located at an axial distance of one another that is less than or equal to the diameter of said orifices. In some embodiments, the facing peripheral edges together define an annular duct for the passage of oil which would serve the same purpose as an annular row of orifices for the passage of oil.

In some embodiments, the axial distance is the distance between the annular end rims of the facing peripheral edges. This distance may facilitate the accurate control of the inter-cage distance.

In some embodiments, the cages may have a maximum outer diameter defined by the radially external ends of said annular end rims. The radial volume thereof is thus defined by these rims.

In some embodiments, the radially external ends of said annular end rims may be offset by a predetermined radial clearance from the internal cylindrical surfaces with the smallest diameter of said planet gear, these surfaces forming inner tracks for the rollers of said bearings.

In some embodiments, the internal cylindrical surfaces of the planet gear may be separated from one another by an annular groove at the bottom of which are formed boreholes for the passage of oil.

In some embodiments, the facing peripheral edges may be located at an axial distance from one another that is less than or equal to the diameter of the orifices.

In some embodiments, the axial distance may be the distance separating the annular end rims from the facing peripheral edges.

In some embodiments, the support comprises radially external annular ribs that define with one another, on the one hand, the external annular grooves for receiving the roller bearings and, on the other hand, an annular external recess surrounded by said facing peripheral edges, at least some of the orifices extending preferably to the radially external free ends of these ribs. Therefore, in some embodiments, the inner rings of the bearings may be formed from a single part with the annular support, which may be advantageous and simplify mounting operations.

The present disclosure further relates to an aircraft turbine engine, characterized in that it comprises at least one device such as described above.

BRIEF DESCRIPTION OF THE FIGURES

Other features and advantages will appear more clearly upon reading the following description of a non-limiting embodiment of the present disclosure and with reference to the appended drawings, wherein.

DETAILED DESCRIPTION

Figure 1:
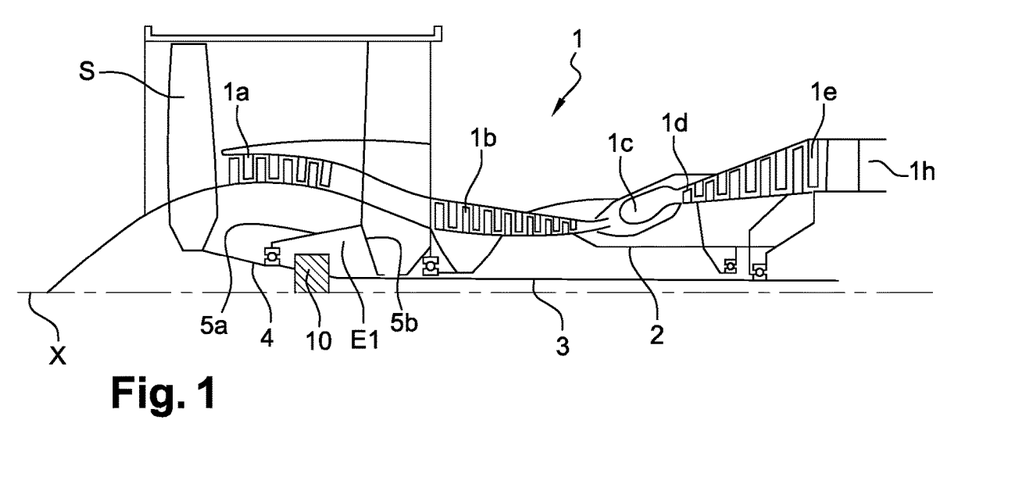
FIG. 1 is a schematic axial cross-sectional view of an exemplary turbine engine according to one embodiment.

FIG. 1 shows a turbine engine 1 that comprises, conventionally, a propeller of a fan S, a low-pressure compressor 1a, a high-pressure compressor 1b, an annular combustion chamber 1c, a high-pressure turbine 1d, a low pressure-turbine 1e, and an exhaust pipe 1h. The high-pressure compressor 1b and the high-pressure turbine 1d are connected by a high-pressure shaft 2 and form with the latter a high-pressure (HP) body. The low-pressure compressor 1a and the low-pressure turbine 1e are connected by a low-pressure shaft 3 and form with the latter a low-pressure (LP) body.

The propeller of the fan S is driven by a fan shaft 4 coupled to the LP shaft 3 by means of a reduction gear 10 with an epicyclic train, shown here schematically.

The reduction gear 10 is positioned in the front part of the turbine engine. A fixed structure comprising schematically, in this case, an upstream section 5a and a downstream section 5b is arranged to form an enclosure E1 around the reduction gear 10. This enclosure E1 is, in this case, closed in the upstream section by gaskets located at the level of a bearing and enabling for the passage of the fan shaft 4, and in the downstream section by gaskets located at the level of the passage of the LP shaft 3.

Figure 2:
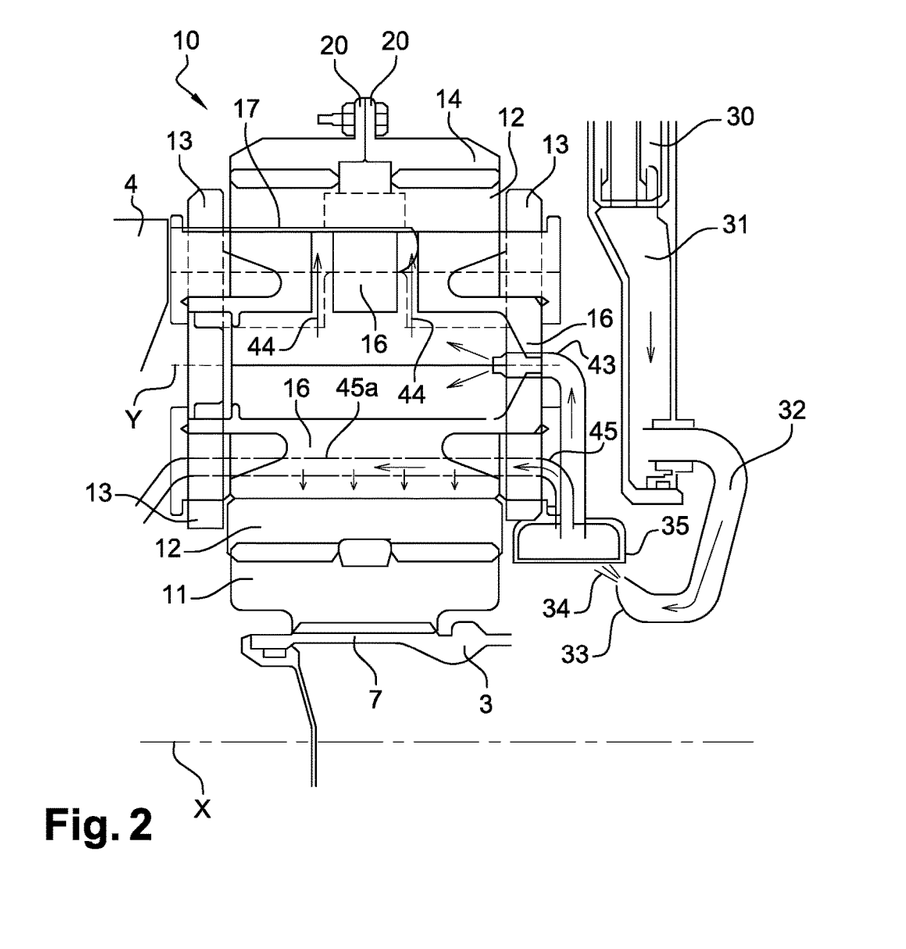
FIG. 2 is an axial cross-sectional view of an exemplary reduction gear according to one embodiment.

With reference to FIG. 2, the reduction gear 10 comprises a ring gear 14 that is secured by a ring gear carrier (not shown) to the fixed structure 5a, 5b, with flexible means (e.g. flexor) to allow it to follow possible movements of the fan shaft 4, for example, in certain downgraded operating modes. In a planetary architecture, the ring gear carrier is made of a part that is more or less flexible and that drives the ring gear, and of a part maintained by roller bearings or bearings whereon the fan is mounted. A brief description thereof can be found, for example, in FR-A1-2987416.

The reduction gear 10 engages, on the one hand, on the LP shaft 3 by means (e.g. joiner) of splines 7 that drive a planetary or solar gearing pinion 11, and on the other hand, on the shaft of the fan 4, which is attached to a planetary carrier 13. Conventionally, the sun pinion 11, the rotation axis X of which is the same as that of the turbine engine, drives a series of planet pinions or planet gears 12 that are regularly distributed around the circumference of the reduction gear 10. The number of planet gears 12 generally ranges from three to seven. The planet gears 12 generally rotate about an axis X of the turbine engine. Except in the case of a planetary gear where they rotate only about the axes of revolution Y thereof, engaging with internal herringbone teeth of the ring gear 14, which is secured to a stator of the turbine engine by means (e.g. clincher) of flanges 20 in the case of an epicyclic gear train or secured to a rotor of the turbine engine in the case of a planetary gear. Each of the planet gears 12 rotates freely about an axis Y defined by a tubular support 16 carried by the planetary carrier 13, by means of a bearing 17 that is generally smooth according to the current technology.

The rotation of the planet gears 12 about the axis Y, due to the engaging of the teeth thereof with the teeth of the ring gear 14, drives the rotation of the planetary carrier 13 about the axis X, and consequently the fan shaft 4 to which it is connected, at a rotational speed less than that of the LP shaft 3.

Figure 3:
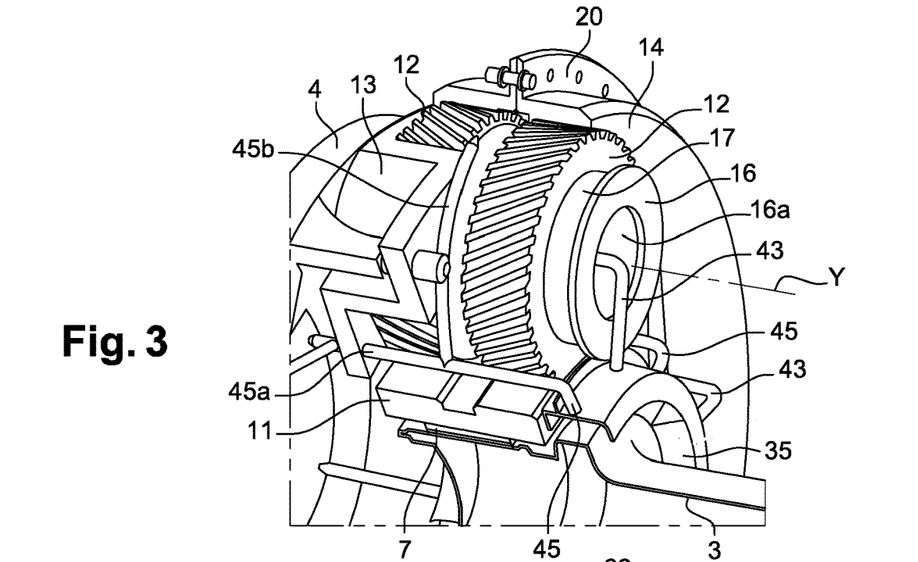
FIG. 3 is a stripped-down perspective view of the reduction gear shown in FIG. 2.

FIG. 2, along with FIG. 3, shows the path of the oil towards the reduction gear 10 and the path thereof inside the reduction gear. In FIG. 2, the arrows show the path taken by the oil from, in this example, a surge tank 31 connected to the fixed structure of the turbine engine, all the way to the pinions and the bearings 17 that require lubrication.

The lubrication device comprises schematically three parts described in succession below: a first part connected to the fixed structure and delivering oil to the rotating parts of the reduction gear 10, a spinning wheel rotating with the planetary carrier 13 receiving the oil, and oil distribution circuits supplied with oil by the spinning wheel to bring it to the parts that require lubrication. The first part comprises at least one injector 32, the calibrated end of which is narrowed to form a nozzle 33. The oil is delivered to the injector by a circulation pipe 30 coming from the engine of the tank (not shown). A surge tank 31 can be installed next to the reduction gear 10 on the pipe, preferably in the high portion, such that the oil can flow towards the center of the reduction gear by gravity. The nozzle 33 ejects oil in the form of a spray 34 formed under the effect of the pressure generated jointly by the supply pump (not show) and by the weight of the oil column above it. In the example shown, the nozzle 33 is positioned radially inside the planetary carrier 13 with respect to the axis X and the spray 34 is oriented with a radial component directed towards the outside of the reduction gear 10. With reference to FIG. 3, the spinning wheel for the reception of oil relating to the planetary carrier 13 mainly comprises a cylindrical cup, in this case with a U-shaped cross-section, the U-shaped opening thereof oriented towards the rotation axis X. The spinning wheel is arranged on the planetary carrier 13 such that the bottom of the U of the cup 35 collects the oil spray 34 ejected by the nozzle 33.

In this case, there are two types of oil distribution circuits. A first series of oil distribution circuits corresponds to the first pipes 43, which are regularly distributed about the circumference of the reduction gear 10 and equal in number to that of the planet gears 12. These pipes 43 extend radially from the cup 35 and penetrate into the inner cavity 16a of each support 16, which is sealed by the planetary carrier 13. The oil circulating in the first pipes 43 penetrates into the inner cavity 16a and is driven by centrifugal force into the orifices 44 that pass through each support 16 as they are oriented radially. These orifices 44 open onto the periphery of the supports 16, at the level of the bearings supporting the pinions of the planet gears 12 and thereby ensure the lubrication of these bearings. The second series of oil distribution circuits comprises the second pipes 45 that extend, from the cup 35 through the planet gears 12 and are divided into several pipes 45a, 45b. The pipes 45a, 45b transport the oil towards the gears formed by the pinions of the planet gears 12 and the sun gear 11, on the one hand, and by the pinions of the planet gears 12 and the outer ring gear, on the other hand. Each pipe 45a extends axially along the pinions of a planet gear 12, between said pinions and the sun gear 11, and forms a lubrication ramp over the entire width of the pinions. The pipe 45b that supplies the gear between the ring gear 14 and the pinions of the planet gears 12 projects the oil thereof at the center of the cylinder formed by each planet gear 12. As shown, each planet gear 12 is in the form of two parallel pinions that engage respectively with the two half ring gears of the ring gear 14 (FIG. 3). The helixes of the teeth of each planet gear are oriented diagonally with respect to the axis Y of rotation of the planet gear 12, to provide them with the function of grooves in which the oil is driven, from the middle of the cylinder to the periphery thereof, to lubricate the gear over the entire width thereof.

Although the above description relates a planetary reduction gear or an epicyclic gear train, it also applies to a mechanical differential wherein the three components, i.e. the planetary carrier 13, the ring gear 14, and the sun gear 11 are rotationally mobile, the rotation speed of one of these components depending on the speed differential of the two other components, in particular.

Figure 4:
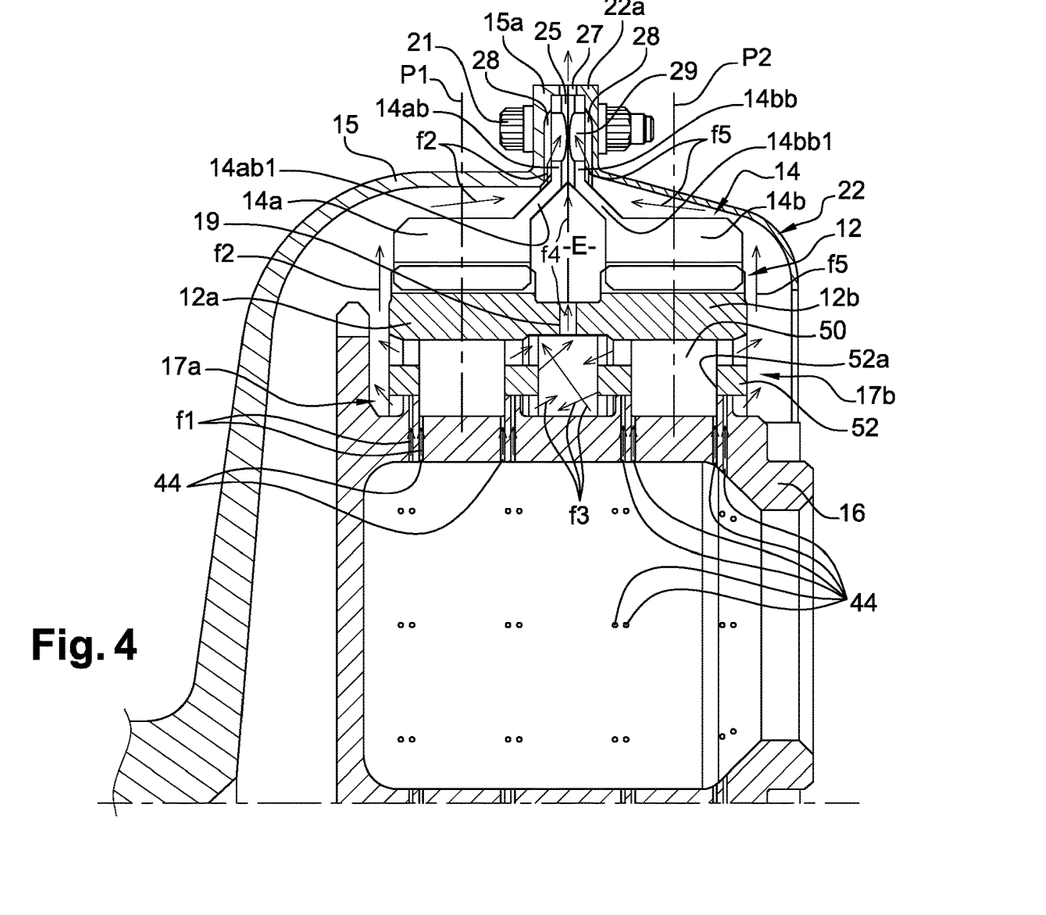
FIG. 4 is a cross-sectional view of a device of the reduction gear-type or of the differential-type, wherein the guiding bearings of the planet gears are roller bearings.

FIG. 4 shows the case where the planet gears 12 of a device of the reduction gear type or of the differential type are centered and rotationally guided on the tubular supports 16 of the satellite carrier 13, by a bearing with one or more rows of rolling elements 17a, 17b. The rows of rolling elements 17a, 17b are termed "bearings" below.

Figure 5:
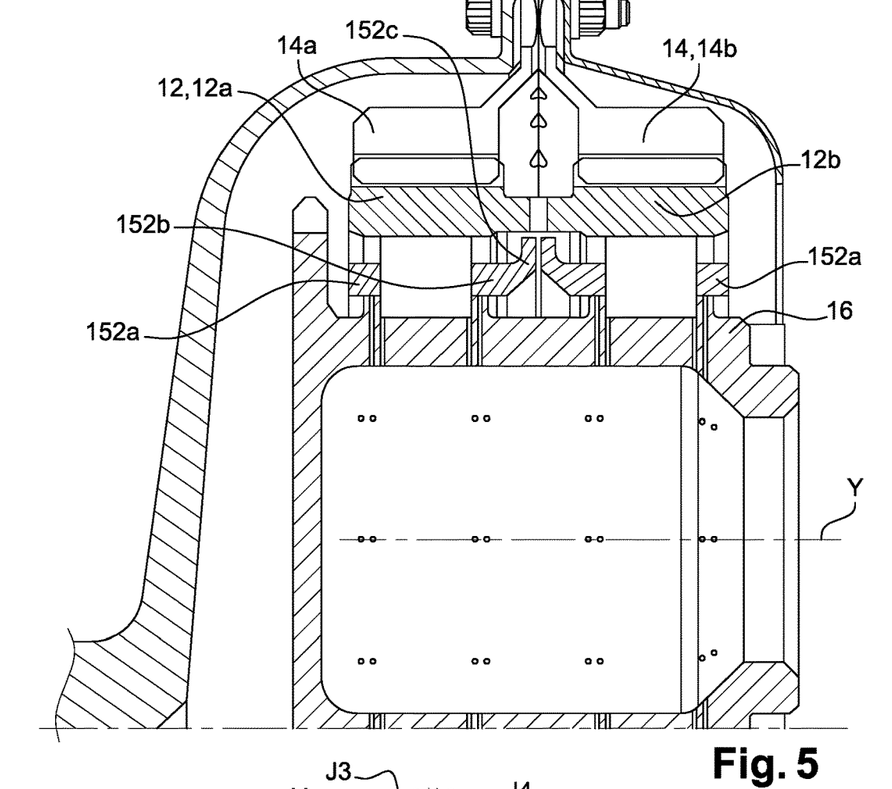
FIG. 5 is a cross-sectional view of a device of the reduction gear-type or of the differential-type, according to one embodiment of the present disclosure.

In the examples of FIGS. 4 and 5, each support 16 is surrounded by the two bearings 17a, 17b, which are roller bearings in the example shown. In this example, each bearing 17a, 17b is associated with a helix 12a, 12b of the herringbone teeth of the planet gear 12, which is geared with two half ring gears 14a, 14b as mentioned above. For example, the bearings 17a, 17b are coaxial and arranged one next to the other, each bearing located in a median plane P1, P2 substantially intersecting with the median plane of each propeller 12a, 12b of the pinion of the planet gear 12 and by the median plane of the propeller of a half ring gear 14a or 14b. The planes P1 and P2 are parallel with one another and perpendicular to the axis Y. The number of bearings 17a, 17b can be different from the example shown. It does not necessarily depend on the number of propellers 12a, 12b, 14a, 14b of herringbone teeth.

Each bearing 17a, 17b comprises an annular row of roller bearings 50 (rollers) arranged in a cage 52 that is formed by a cylindrical ring comprising an annular row of through-apertures 52a for receiving the roller bearings. The cages 52 are independent and axially offset from one another. In the case shown in the drawings, the rings or the inner and outer tracks of each bearing are formed of one single part with the support 16, on the one hand, and the planet gear 12, on the other hand.

As is seen in FIG. 4, the bearings 17a, 17b are at an axial distance from one another. This is also the case for the propellers 12a, 12b of the pinion of the planet gear 12 and the propellers of the half ring gears 14a, 14b. The propellers 12a, 12b are connected by a cylindrical shroud made of a material that comprises an annular row of radial boreholes 19 required for the oil to flow during operations and to avoid needing boreholes in the herringbone teeth.

Each half ring gear 14a, 14b comprises an annular body with a general cylindrical shape and connected to an annular flange 14ab, 14bb that extends radially outwards. Each body comprises an internal propeller. Although it is not shown in the drawings, the propellers of the half ring gears fit with the helixes 12a, 12b of the planet gear, which are of the type shown in FIG. 3. The propellers of the two half ring gears 14a, 14b therefore have a herringbone configuration.

The body of each half ring gear is connected by one of the longitudinal ends thereof to the corresponding flange 14ab, 14bb by means of an annular rim 14ab1, 14bb1.

Each flange 14ab, 14bb extends substantially in a radial direction and bears against the other flange in a substantially radial joint plane P. The rims 14ab1, 14bb1 here have a general frusto-conical shape and, in this case, converge towards one another radially outwards.

The flanges 14ab, 14bb are used to secure the half ring gears 14a, 14b to one another, as well as to a ring gear carrier 15 and to an oil collector 22 in the example shown.

For this purpose, the flanges 14ab, 14bb each comprise an annular row of axial through-orifices for the passage of attachment means 21, e.g. attachment device, of the screw-nut type or similar. The orifices of the flanges are aligned and receive the attachment means 21.

The ring gear carrier 15 also comprises an annular flange 15a for attachment to the flanges 14ab, 14bb. The flange 15a is applied axially on one of the flanges 14ab, 14bb, namely the flange 14ab in the example shown. The flange 14ab is thus inserted axially between the flange 15a and the flange 14bb. The converse configuration is also possible.

The flange 15a comprises orifices aligned with the orifices of the flanges 14ab, 14bb and that also receive the attachment means 21, the heads of which can be applied axially on the upstream face of the flange 15a and nuts can be applied axially on the downstream face of the flange 14bb or conversely. In the example shown, a flange 22a of the annular oil collector 22 bears axially against the flange 14bb and receives on the downstream face thereof, the heads of the nuts. The flange 22a comprises orifices aligned with the orifices of the flanges 14ab, 14bb, 15a and receive the attachment means 21.

The rims 14ab1, 14bb1 delimit an annular space E that, in this case, has a cross-section with a general triangular shape, the tip of which is radially oriented outwards.

Due to the shape of the rims 14ab1, 14bb1 and the connection thereof, respectively, to the downstream and upstream longitudinal ends of the bodies of the half ring gears, these bodies are axially spaced from one another by a predetermined distance.

The inter-propeller axial distance 12a, 12b may result from manufacturing constraints. Each planet gear comprises an inner roller track. To reduce the actual surface to be machined to the required amount, this internal cylindrical surface is divided into several tracks of reduced axial length, the number of which is equal to the number of bearings 17a, 17b. This provides an annular groove 12c for the collection of oil between the tracks, it reduces the weight because the planet gear is less subject to stresses at that location and it reduces manufacturing complexity for elements that require a high degree of accuracy, as several tracks are created independently from one another and the total surface having a high degree of accuracy is smaller with the grooves between each track. The boreholes 19 are formed at the bottom of this groove 12c.

The lubricating oil is intended to flow during operations through the inter-body space E. Substantially radial passages are provided between the flanges 14ab, 14bb to allow the evacuation of oil radially outside of the ring gear 14.

The oil passages are, in this case, formed, on the one hand, by substantially radial crescent-shaped notches 25 formed in the surfaces facing the flanges 14ab, 14bb. Each flange 14ab, 14bb comprises an annular row of crescent-shaped notches 25 axially aligned with the crescent-shaped notches 25 of the other of the flanges. The crescent-shaped notches are created at a distance from the orifices for the passage of the attachment means 21. Each crescent-shaped notch has, for example, a cross-section with a semi-circular shape (semi-oblong shape) or a rectangular shape.

The crescent-shaped notches 25 fluidly connect, at the radially internal ends thereof, with the space E, and at the axially external ends thereof, with the notches 27 for the output of oil provided on the cylindrical rims located on the outer periphery of the flanges 15a, 22a (FIG. 4).

Oil passages are further formed by substantially radial crescent-shaped notches 28 formed in the bearing surfaces of the flanges 22a, 15a (FIG. 4). Each flange 22a, 15a comprises an annular row of crescent-shaped notches 28. The crescent-shaped notches 28 are provided at a distance of the orifices for the passage of the attachment means 21 and communicate with the through-orifices 29 provided at the bottom of the crescent-shaped notches 25 of the flanges 14ab, 14bb. Each crescent-shaped notch has, for example, a cross-section with a semi-circular shape (semi-oblong shape) or a rectangular shape.

The oil that flows through the orifices 44 of the support 16 (arrows f1) lubricates the bearings 17a, 17b and then flows radially outwards from these bearings. The lubrication may cool the rolling elements as well as the cage 52. Once these elements have cooled, the lubrication can follow one of three possible paths.

The first path is indicated by arrows f2. In this path, the lubricating oil is ejected from the front side of the reduction gear (or through the left end of the roller bearing on the drawing) and raises through the ring gear carrier 15 to reach the crescent-shaped notches 28. The oil is then transferred through the orifices 29 between the flanges 14ab, 14bb of the half ring gears to be ejected through the notches 27.

The second path is indicated by arrows f3 and f4. In this path, the lubricating oil is trapped between the bearings 17a, 17b. Under the effect of centrifugal forces, gravity and ventilation, the lubricating oil is sent to the circular groove 12c located between the two inner rolling tracks (arrows f3), then exits the planet gear 12 through the boreholes 19 to arrive in the space E formed by the two assembled half ring gears (arrows f4). At the end of this cavity, the crescent-shaped notches 25 and the notches 27 eject the oil from the reduction gear by centrifugal force of the rotating ring gear.

The third path is indicated by arrows f5. In this path, the lubricating oil is ejected from the rear side of the reduction gear (or through the right end of the roller bearing on the drawing) and raises through the oil collector 22 to reach the crescent-shaped notches 28. The oil is then transferred through the orifices 29 of the flange of the rear half ring gear to be ejected by the central path formed by the notches 27 of the two assembled half ring gears.

In the case shown in FIG. 4, the flow of oil from the orifices 44 to the space E is not optimized. The oil following the second path may stagnate and reduce the lubricating and cooling efficiency thereof on the bearings 17a, 17b. The cages 52 of the bearings 17a, 17b comprise peripheral facing rims that are identical and at an axial distance from one another, and that are not adapted to the guiding of the oil during operations.

FIGS. 5 to 9 show two alternative embodiments of the present disclosure. The embodiments shown relate to a reduction gear or a differential such as described above.

The device of FIG. 5 differs from that described above mainly in the shape of the cages thereof. Unlike the cages 52 of FIG. 4 which are symmetrical with respect to the corresponding median plane P1 or P2, the cage 152 of each bearing does not have such a symmetry.

Each cage 152 is formed by a ring of which an axial peripheral edge 152a is cylindrical and of which the other axial peripheral edge 152b comprises a frusto-conical surface or portion, or a wall portion 152c. The detailed and larger-scale view of FIG. 5 shows that the edge 152b comprises a frusto-conical portion 152c that ends at the free end thereof by an annular rim 152d oriented radially outwards. The portion 152c comprises an internal frusto-conical surface 152c1 for guiding the oil, which extends between an internal cylindrical surface 152b1 of the edge 152b and a radial surface 152d1 of the rim 152d. In an alternative version, not shown, the edge 152b could comprise only a cylindrical part that ends with an annular rim 152d oriented radially outwards; in that case, it would not comprise a frusto-conical portion 152c.

The edges 152b of the cages 152 of the bearings 17a, 17b face one another and are at a predetermined distance from one another, to control the axial clearance J3 between the surfaces 152d1 of the rims 152. This axial clearance J3 can be less than or equal to the diameter of the orifices 44. This clearance J3 must be sufficiently wide to let through the flow of oil circulating along the abovementioned path No. 2.

As mentioned above, these orifices 44 pass radially through the tubular wall of the support 16. In the example shown, the support 16 comprises radially external annular ribs 16b that define external annular grooves 54 for receiving the roller bearings 50 and an external annular recess 56 surrounded by facing peripheral edges 152b. The ribs 16b thus serve as axial abutments for the rolling elements of the bearings 17a, 17b. At least some of the orifices 44 extend to the radially external free ends of the ribs 16b.

Figure 8:
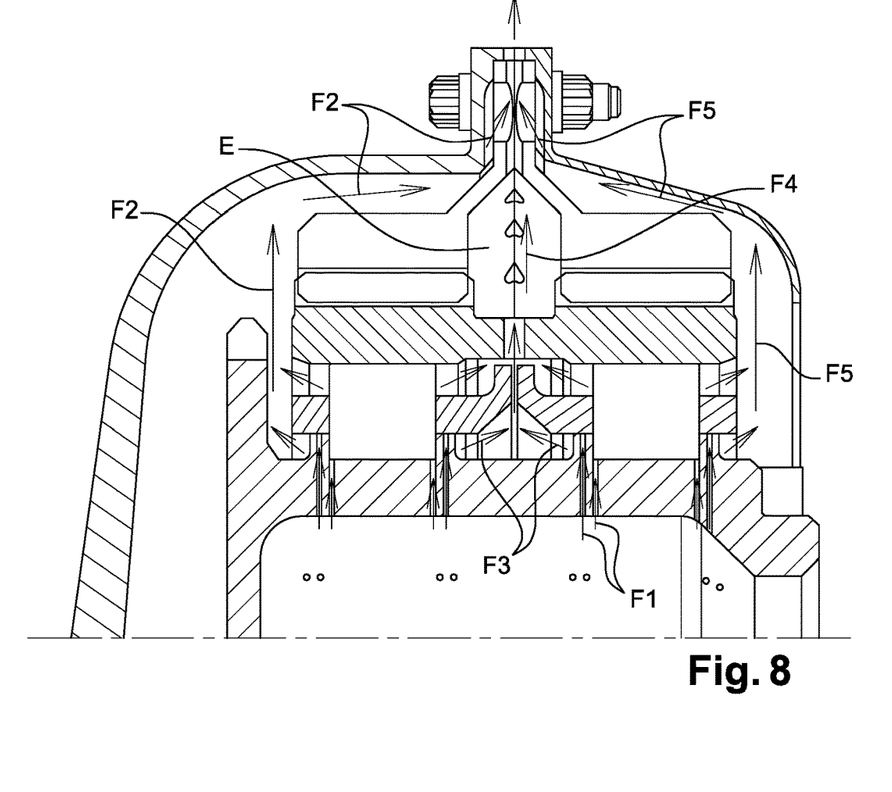
FIG. 8 is a view showing the path taken by the lubricating oil during operations according to one embodiment.

The flow of oil from the orifices 44 (arrows F1) is ensured by the frusto-conical surfaces 152c1 and the clearance J3, which guide the oil to the boreholes 19 and to the space E (arrows F3 and F4 of FIG. 8). The first and second oil paths, indicated by arrows f2 and f5, are identical to those described above.

Figure 6:
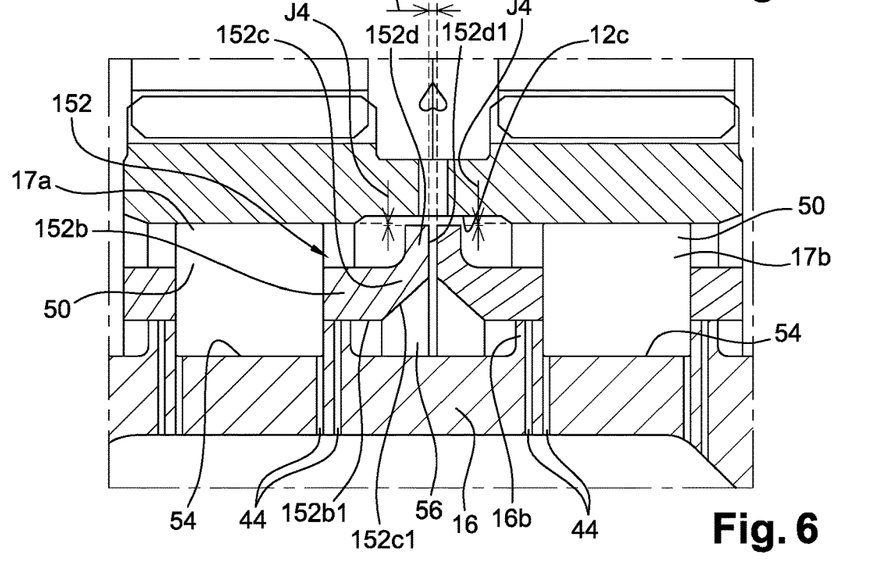
FIG. 6 is a detailed and larger scale view of a part of FIG. 5.
Figure 7:
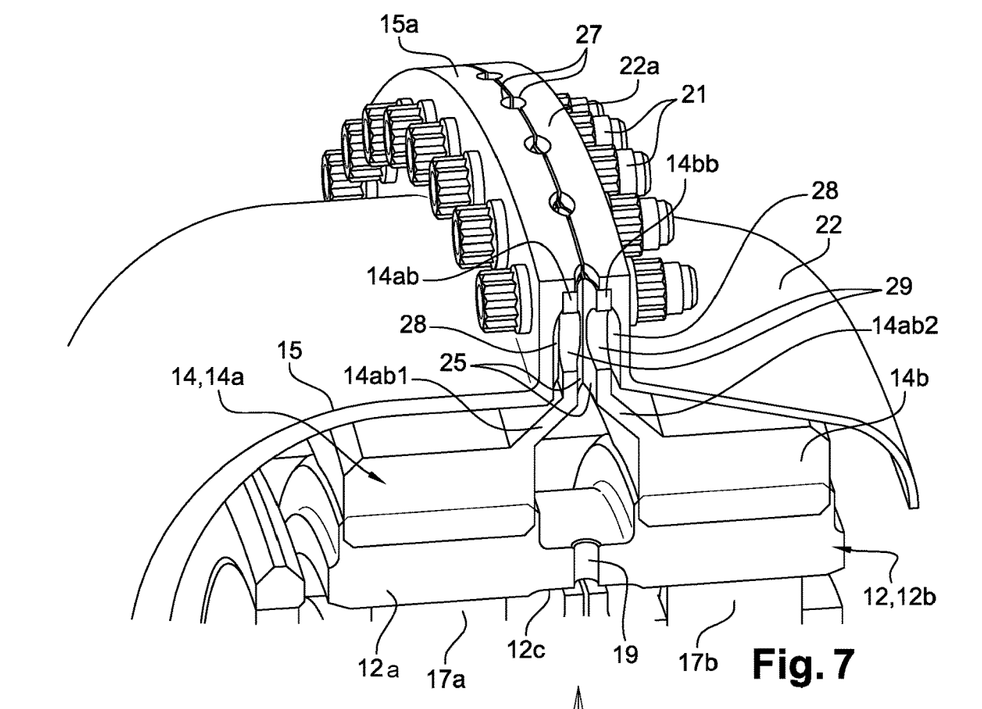
FIG. 7 is a cross-sectional and perspective view of a part of the device of FIG. 5.

The cages 152 have a maximum outer diameter defined by the radially outer ends of the rims 152d. This diameter is a function of the inner diameter of the propellers 12a, 12b, such that the radial distance the oil has to cover between the cages 152 and the planet gear 12 is as short as possible. In some embodiments, there is a predetermined radial mounting clearance J4 between the radially external ends of the rims 152d and the smallest diameter internal cylindrical surfaces of the planet gear 12 (FIG. 6). These surfaces form the inner tracks of the bearings 17a, 17b.

In the example shown, the joint plane of the flanges 14ab, 14bb of the half ring gears intersects with the axes of the boreholes 19 and in the middle between the cages 152. The boreholes 19 open radially inwards into the groove 12c and the rims 152d are oriented radially outwards towards the groove 12c. These rims are here axially offset from the tracks of the rollers of the bearings 17a, 17b. The annular rims 152d form a small wall, the first purpose of which is to guide the oil of the bearings 17a, 17b in the annular groove 12c of the planet gear 12 and the second purpose of which is to prevent the transition of oil from a bearing 17a to another bearing 17b.

Figure 9:
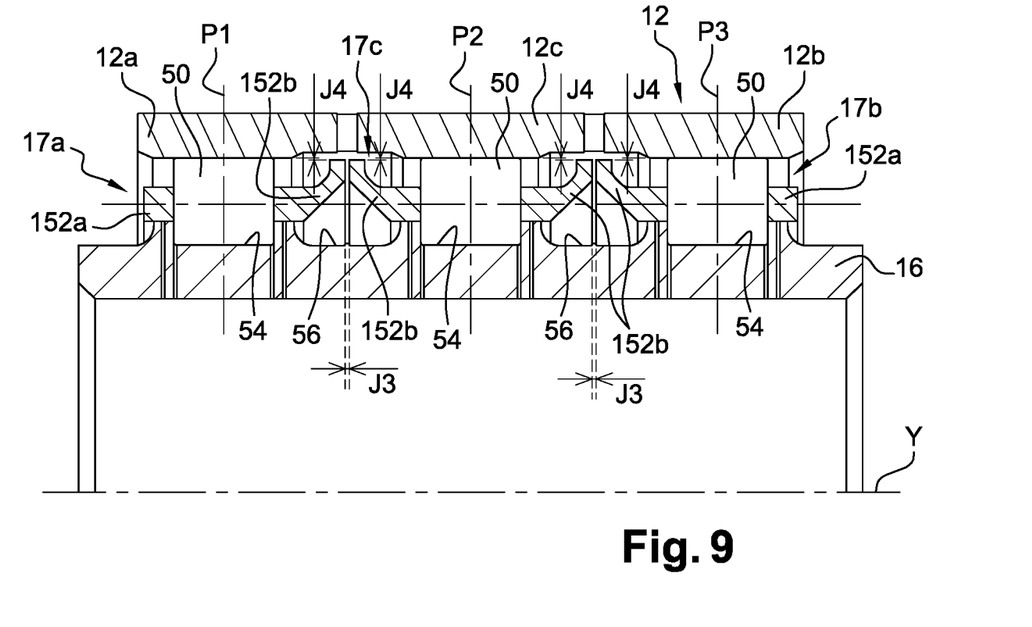
FIG. 9 is a view showing an alternative embodiment of the invention.

The device of FIG. 9 represents an alternative embodiment with three bearings 17a, 17b, 17c mounted coaxially and in an adjacent manner around the support 16. The bearings 17a and 17b are similar to those described above and are arranged on either side of a third bearing 17c, termed central or intermediate bearing. This bearing 17c has peripheral edges 152b, with a frusto-conical portion, that are identical and shaped to ensure guiding of oil with the peripheral edges 152b facing the other two bearings 17a, 17b. Unlike the bearings 17a, 17b, the bearing 17c therefore comprises a median plane of symmetry P3.

This type of guiding with three bearings can be used for a planet gear 12 with three propellers 12, 12b, 12c, each bearing being associated with a pinion and radially aligned with said pinion in a median plane P1, P2 or P3.

The embodiments of the invention in which an exclusive property or privilege is claimed are defined as follows:

1. A device for a turbine engine of an aircraft, said device being a reduction gear device or a differential device and comprising:
   a central sun gear with a rotation axis X;
   a ring gear extending about the axis X and the sun gear; and
   a planetary carrier supporting an annular row of planet gears arranged between the sun gear and the ring gear, and engaged with the sun gear and the ring gear,
   the planet gears having rotation axes Y substantially parallel to axis X,
   the sun gear comprising splines for coupling to a first shaft of the turbine engine, and at least one of the planetary carrier or the ring gear being attached to a second shaft of the turbine engine,
   each of the planet gears being rotationally guided by at least one bearing extending about a tubular support with an axis Y of the planetary carrier,
   the tubular support comprising an inner cavity to receive oil and substantially radial through-orifices for passage of oil from the inner cavity to the at least one bearing,
   wherein the at least one bearing includes at least two bearings mounted coaxially and adjacently around the tubular support and comprising annular rows of roller bearings maintained in cages that have substantially the same diameter and of which facing peripheral edges are shaped to guide the oil supplying the at least two bearings radially outwardly with respect to the axis Y,
   the peripheral edges each comprising a frusto-conical surface or an annular end rim that extends radially outwardly.

2. The device of claim 1, wherein three bearings are mounted coaxially and in an adjacent manner around the support, said three bearings including two end bearings and an intermediate bearing located between said two end bearings.

3. The device of claim 2, wherein said intermediate bearing includes two peripheral edges each comprising a frusto-conical portion or surface.

4. The device of claim 1, wherein the cages have a maximum outer diameter defined by radially external ends of the annular end rims.

5. The device of claim 4, wherein the radially external ends of the annular end rims are offset by a predetermined radial clearance from a smallest diameter of internal cylindrical surfaces of the planet gear, wherein internal cylindrical surfaces form inner tracks for the rollers of the bearings.

6. The device of claim 5, wherein the internal cylindrical surfaces of the planet gear are separated from one another by an annular groove at a bottom of which are formed boreholes for the passage of oil.

7. The device of the claim 1, wherein the facing peripheral edges are located at an axial distance from one another that is less than or equal to the diameter of the orifices.

8. The device according to the claim 7, wherein the axial distance is the distance separating the annular end rims of the facing peripheral edges.

9. The device according of claim 1, wherein the support comprises radially external ribs that together define external annular grooves receiving the roller bearings and at least one outer annular recess surrounded by the facing peripheral edges, wherein at least some of the orifices extend to free ends of the radially external ribs.

10. A turbine engine of an aircraft, comprising at least one device according to claim 1.

11. A device for a turbine engine of an aircraft, said device being a reduction gear device or a differential device and comprising:
   a central sun gear with a rotation axis X;

a ring gear extending about the axis X and the sun gear; and a planetary carrier supporting an annular row of planet gears arranged between the sun gear and the ring gear, and engaged with the sun gear and the ring gear, the planet gears having rotation axes Y substantially parallel to axis X, the sun gear comprising splines for coupling to a first shaft of the turbine engine, and at least one of the planetary carrier or the ring gear being attached to a second shaft of the turbine engine, each of the planet gears being rotationally guided by at least one bearing extending about a tubular support with an axis Y of the planetary carrier, the tubular support comprising an inner cavity to receive oil and substantially radial through-orifices for passage of oil from the inner cavity to the at least one bearing, wherein the at least one bearing comprises at least two bearings mounted coaxially and adjacently around the tubular support and comprising annular rows of roller bearings maintained in cages that have substantially the same diameter and of which facing peripheral edges are shaped to guide the oil radially outwardly with respect to the axis Y, the peripheral edges each comprising a frusto-conical surface or an annular end rim that extends radially outwardly, wherein three bearings are mounted coaxially and in an adjacent manner around the support, said three bearings including two end bearings and an intermediate bearing located between said two end bearings, and wherein said intermediate bearing includes two peripheral edges each comprising a frusto-conical surface.

12. A device for a turbine engine of an aircraft, said device being a reduction gear device or a differential device and comprising:

a central sun gear with a rotation axis X;

a ring gear extending about the axis X and the sun gear; and a planetary carrier supporting an annular row of planet gears arranged between the sun gear and the ring gear, and engaged with the sun gear and the ring gear, the planet gears having rotation axes Y substantially parallel to axis X, the sun gear comprising splines for coupling to a first shaft of the turbine engine, and at least one of the planetary carrier or the ring gear being attached to a second shaft of the turbine engine, each of the planet gears being rotationally guided by at least one bearing extending about a tubular support with an axis Y of the planetary carrier, the tubular support comprising an inner cavity to receive oil and substantially radial through-orifices for passage of oil from the inner cavity to the at least one bearing, wherein the least one bearing comprises at least two bearings mounted coaxially and adjacently around the tubular support and comprising annular rows of roller bearings maintained in cages that have substantially the same diameter and of which facing peripheral edges are shaped to guide the oil radially outwardly with respect to the axis Y, the peripheral edges each comprising a frusto-conical surface or an annular end rim that extends radially outwardly, wherein the cages have a maximum outer diameter defined by radially external ends of the annular end rims, wherein the radially external ends of the annular end rims are offset by a predetermined radial clearance from a smallest diameter of internal cylindrical surfaces of the planet gear, wherein internal cylindrical surfaces form inner tracks for the rollers of the bearings.

13. A device for a turbine engine of an aircraft, said device being a reduction gear device or a differential device and comprising:

a central sun gear with a rotation axis X;

a ring gear extending about the axis X and the sun gear; and a planetary carrier supporting an annular row of planet gears arranged between the sun gear and the ring gear, and engaged with the sun gear and the ring gear, the planet gears having rotation axes Y substantially parallel to axis X, the sun gear comprising splines for coupling to a first shaft of the turbine engine, and at least one of the planetary carrier or the ring gear being attached to a second shaft of the turbine engine, each of the planet gears being rotationally guided by at least one bearing extending about a tubular support with an axis Y of the planetary carrier, the tubular support comprising an inner cavity to receive oil and substantially radial through-orifices for passage of oil from the inner cavity to the at least one bearing, wherein the least one bearing includes at least two bearings mounted coaxially and adjacently around the tubular support and comprising annular rows of roller bearings maintained in cages that have substantially the same diameter and of which facing peripheral edges are shaped to guide the oil radially outwardly with respect to the axis Y, the peripheral edges each comprising a frusto-conical surface or an annular end rim that extends radially outwardly, wherein the facing peripheral edges are located at an axial distance from one another that is less than or equal to the diameter of the orifices, wherein the axial distance is the distance separating the annular end rims of the facing peripheral edges.

14. A device for a turbine engine of an aircraft, said device being a reduction gear device or a differential device and comprising:

a central sun gear with a rotation axis X;

a ring gear extending about the axis X and the sun gear; and a planetary carrier supporting an annular row of planet gears arranged between the sun gear and the ring gear, and engaged with the sun gear and the ring gear, the planet gears having rotation axes Y substantially parallel to axis X, the sun gear comprising splines for coupling to a first shaft of the turbine engine, and at least one of the planetary carrier or the ring gear being attached to a second shaft of the turbine engine, each of the planet gears being rotationally guided by at least one bearing extending about a tubular support with an axis Y of the planetary carrier, the tubular support comprising an inner cavity to receive oil and substantially radial through-orifices for passage of oil from the inner cavity to the at least one bearing, wherein the at least one bearing includes at least two bearings mounted coaxially and adjacently around the tubular support and comprising annular rows of roller bearings maintained in cages that have substantially the same diameter and of which facing peripheral edges are shaped to guide the oil radially outwardly with respect to the axis Y, the peripheral edges each comprising a frusto-conical surface or an annular end rim that extends radially outwardly, wherein the support comprises radially external ribs that together define external annular grooves receiving the roller bearings and at least one outer annular recess surrounded by the facing peripheral edges, wherein at least some of the orifices extend to free ends of the radially external ribs.

15. The device of claim 4, wherein each of the peripheral edges comprises a frusto-conical surface leading to an annular end rim, wherein the radially external ends of the annular end rims are offset, said annular end rims arranged to guide oil in a portion of the planet gear and to prevent a transition of oil from a first bearing of the at least two bearings to a second bearing of the at least two bearings.

16. The device of claim 1, wherein the peripheral edges are shaped to guide the oil to a space positioned radially outwardly of the at least two bearings with respect to the axis Y.

17. The device of claim 16, wherein the space is disposed externally of the planet gears.

* * * * *

UNITED STATES PATENT AND TRADEMARK OFFICE
CERTIFICATE OF CORRECTION

Page 1 of 1

PATENT NO. : 11,131,249 B2
APPLICATION NO. : 16/522507
DATED : September 28, 2021
INVENTOR(S) : J. Di Giovanni et al.

It is certified that error appears in the above-identified patent and that said Letters Patent is hereby corrected as shown below:

On the Title Page

| Column | Line | |
|---|---|---|
| Item (57)/ Abstract | 10 | change "The least" to -- The at least -- |

In the Claims

| Column | Line | |
|---|---|---|
| 11 | 55 | change "the least" to -- the at least -- |
| 12 | 28 | change "the least" to -- the at least -- |

Signed and Sealed this
Sixteenth Day of August, 2022

Katherine Kelly Vidal
*Director of the United States Patent and Trademark Office*